June 5, 1934.  B. A. BENSON  1,961,546
ELECTRICALLY DRIVEN LATHE
Filed Oct. 2, 1933    3 Sheets-Sheet 2
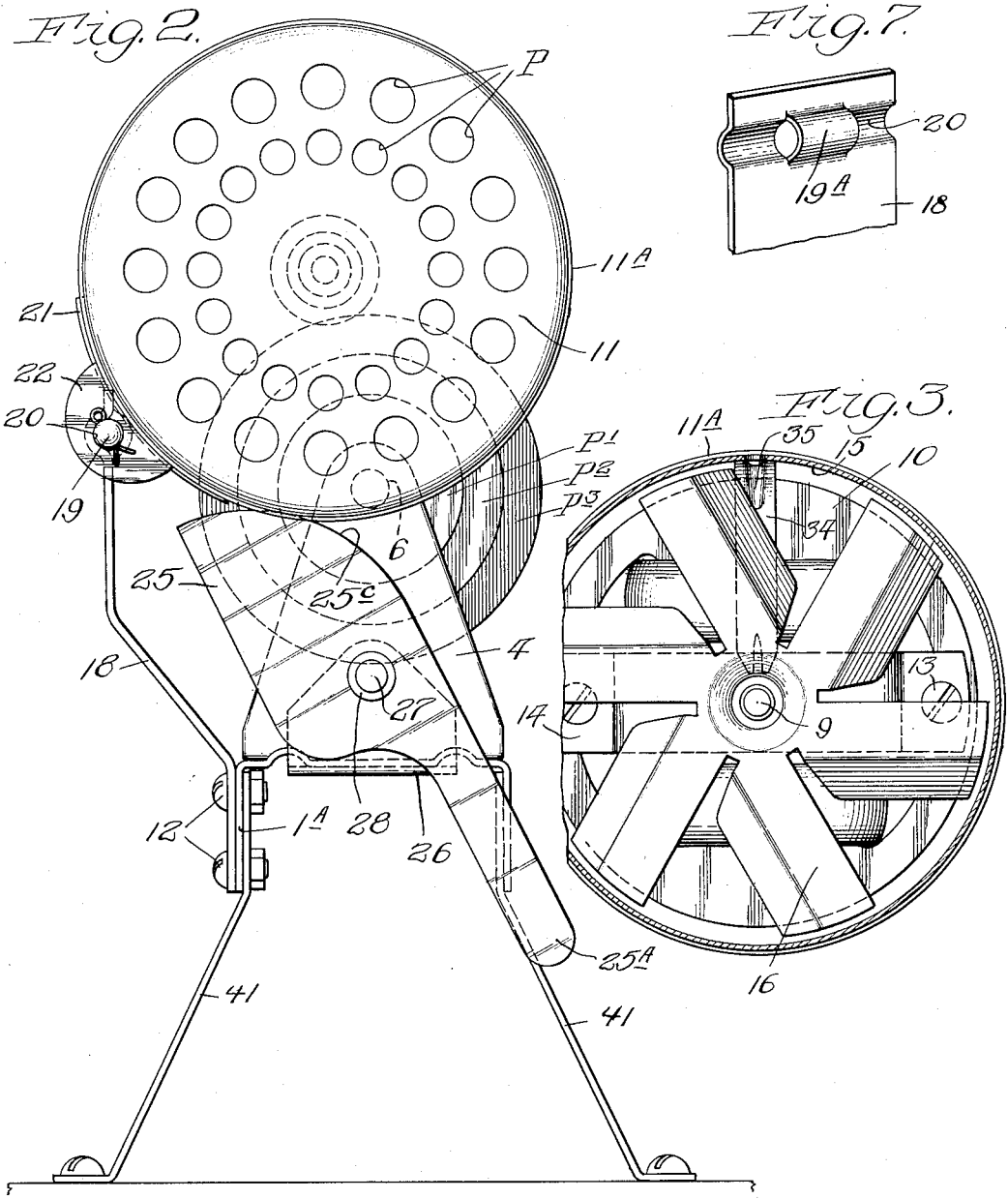
Inventor:
Bernhart A. Benson
by Albert Scheith
Attorney

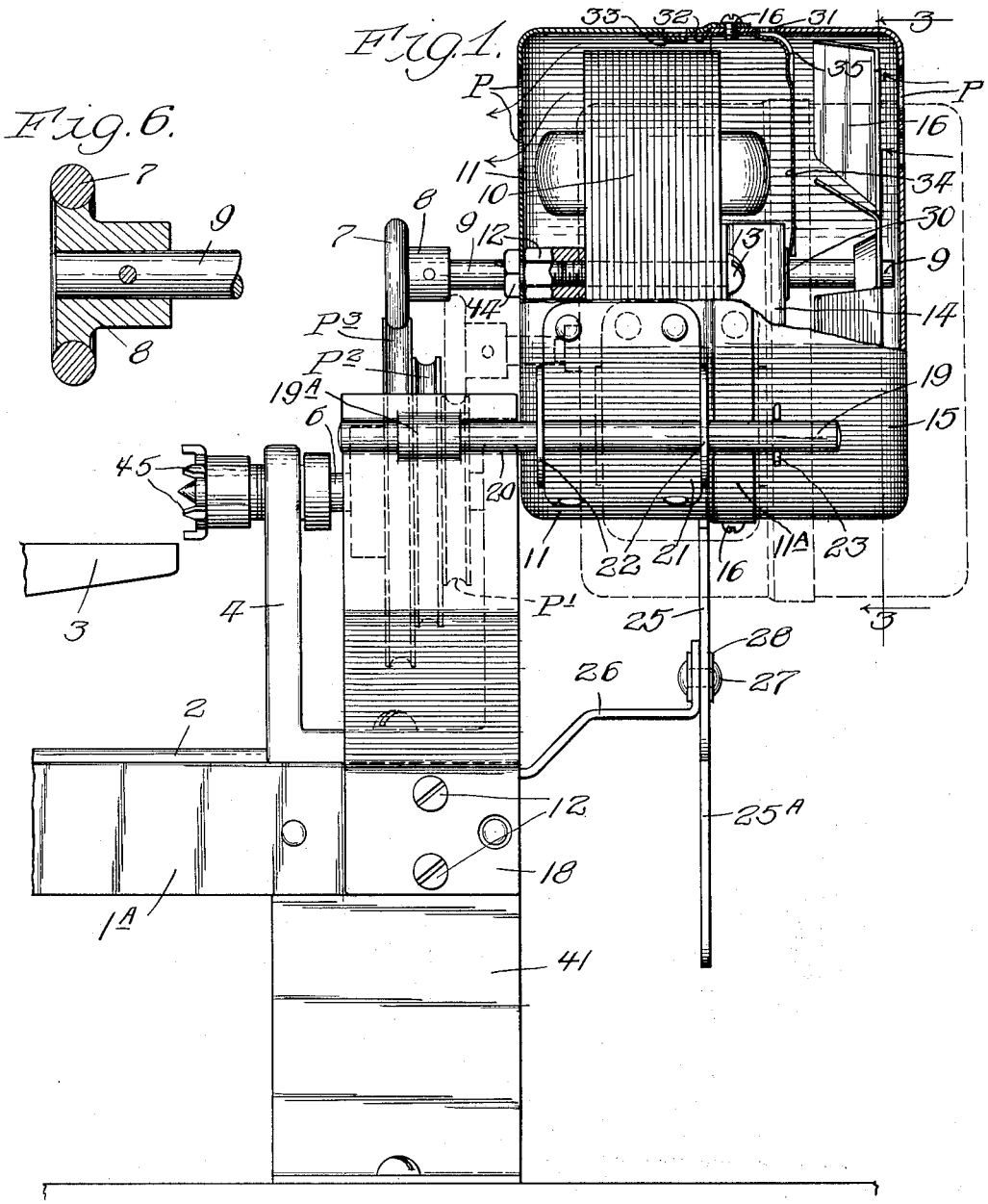

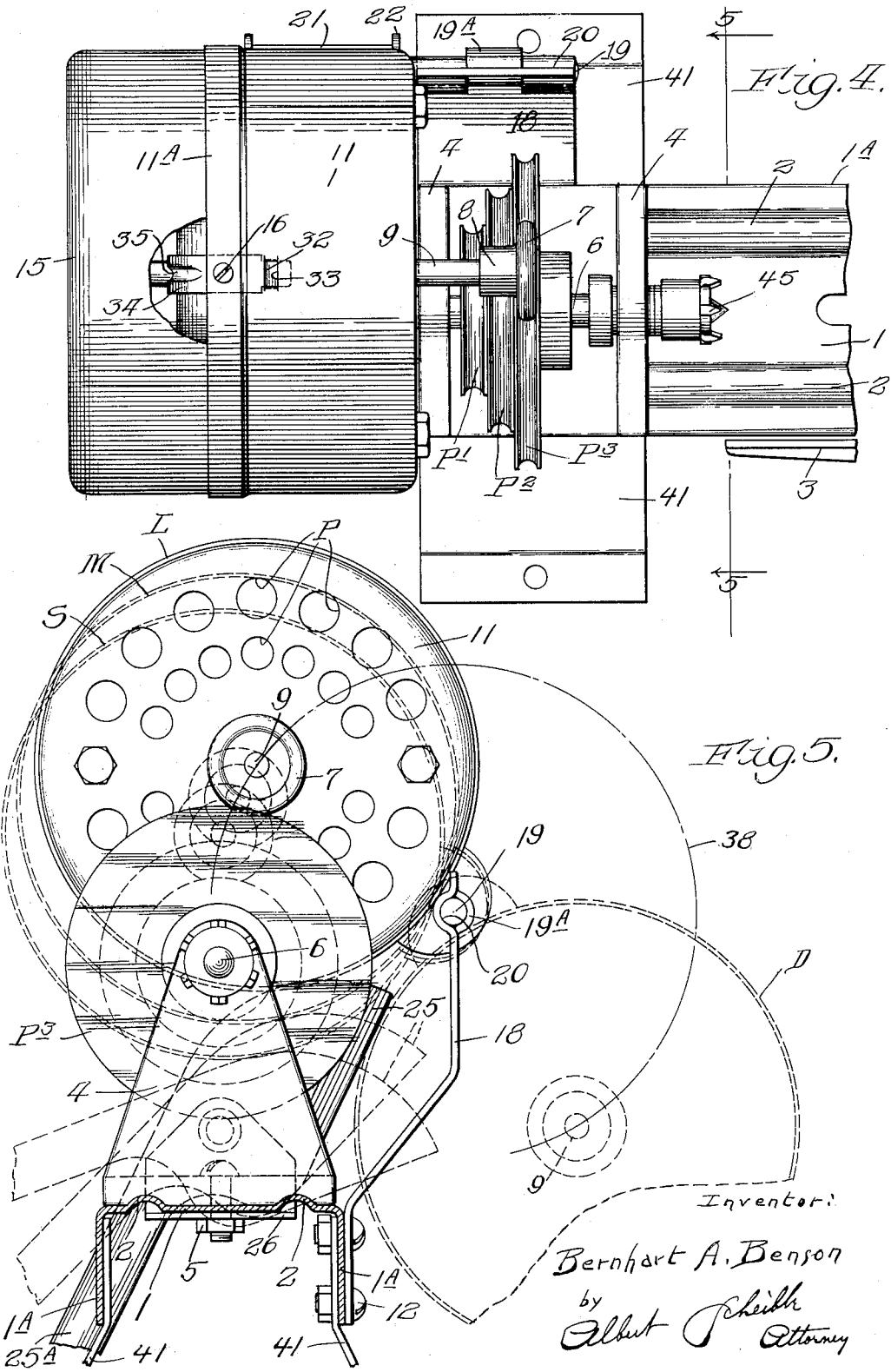

Patented June 5, 1934

1,961,546

UNITED STATES PATENT OFFICE 1,961,546

ELECTRICALLY DRIVEN LATHE

Bernhart A. Benson, Chicago, Ill., assignor to Chicago Electric Manufacturing Company, Chicago, Ill., a corporation of Illinois Application October 2, 1933, Serial No. 691,805

21 Claims. (Cl. 172—36)

My invention relates to an electrically operated friction-drive mechanism for actuating an appliance having a horizontal shaft, as for example a speed lathe used for wood turning.

Among the general objects of my invention are those of providing an expeditiously manufactured and inexpensive electric driving mechanism of this class which can readily be attached to such an appliance, which can conveniently be used in connection with a multi-grooved pulley on the lathe for varying the speed, which will readily permit the friction at the driving connection to be varied and adjusted instantly, and which will enable the user to discontinue and to resume the driving action almost instantly without halting the electric motor of the mechanism and without requiring any skill on the part of the user.

Furthermore, my invention relates to a driving mechanism of this class in which the electric motor is disposed in "outboard" fashion beyond the head of the appliance, and aims to provide unusually simple and inexpensive means for supporting the motor with freedom for certain bodily movements of the motor, together with simple auxiliary means for supporting the motor so as to reduce the strains imposed on the aforesaid supporting means by the outwardly overhanging disposition of the motor.

In a still further aspect, my invention aims to provide simple means for keeping wood shavings and the like away from the motor, aims to accomplish this by means which will also cool the motor, and aims to provide novel means for feeding oil to an inaccessible portion of the motor.

Illustrative of my invention and of more detailed objects of the same,

Fig. 1 is a side elevation of the head end portion of a wood-turning lathe having a variable speed electric driving mechanism attached to it according to my invention, showing this mechanism as adjusted in its slowest-speed driving position, with dotted lines indicating the position of certain parts in the highest speed adjustment, and with a portion of the housing for the motor broken away.

Fig. 2 is an end elevation, taken from the right-hand side of Fig. 1.

Fig. 3 is a fragmentary vertical section taken along the line 3—3 of Fig. 1.

Fig. 4 is a corresponding plan view, with the electric drive in the slowest-speed adjustment, and with only a small portion of the motor housing broken away to show the oil-feeding strip.

Fig. 5 is a vertical section taken along the line 5—5 of Fig. 4, with lines showing the outline of the motor and of the auxiliary motor-supporting in the medium speed and the high speed driving position, and in an inoperative position of the motor.

Fig. 6 is an enlarged vertical section of the inner end of the motor shaft and the drive wheel fastened to this shaft.

Fig. 7 is a perspective view of the upper end of the bracket supporting the rod on which the motor is swiveled.

Since my mechanism is particularly suited for an inexpensive wood-turning lathe designed for home use, I am illustrating it as applied to a lathe in which the bed is an inverted channel 1 made of heavy sheet metal and having its top or channel-back formed with parallel riser ridges 2 which guide the foot of the usual tool-rest 3, which ridges also serve to hold the axis of the lathe head 4 parallel to the said ridges when that head is fastened to the said bed by bolts 5, as shown in Fig. 5. For an inexpensive construction, the lathe bed may be supported by legs 41 formed of steel strips and fastened at their upper ends to the depending flanges 1A of the channel-sectioned bed.

Fastened to a spindle 6 which is journaled in the head 4 are three grooved wheels P1, P2 and P3 which increase progressively in size forwardly of the spindle, each of which wheels has its groove corresponding approximately in radius to that of a rubber ring 7 embracing the wheel part 8 of a drive wheel (Fig. 6) which is fastened to the forward end of the shaft 9 of the electric motor of my driving mechanism.

As here shown, this motor is of an alternating current type including a stator core 10 coaxial both with the motor shaft 9 and with a two-part casing which is fastened to the stator core, each part of the casing being a cap-like member of larger bore than the generally cylindrical periphery of the stator core, and the forward casing part 11 being directly fastened to the stator core. To effect this fastening, I provide elongated nuts 12 for each of the usual bolts 13 which extend through the laminations of the stator core and which bolts may also clamp to the stator the bridges 14 carrying the bearings for the motor shaft. These nuts 12 are disposed forwardly of the stator core and the head of the forward casing part 11 is clamped against the said nuts by screws 44 which are also threaded into the said nuts.

The rear or mouth-end portion 11A of the forward casing part 11 is diametrically enlarged, as shown in Figs. 1 and 4, so that the mouth end portion of the rear casing part 15 can telescope into it, and these overlapping portions of the two casing parts are fastened to each other by screws 16, the upper of which may also serve to support the hereafter described oil guiding strip 34.

To cool the motor and to prevent shavings or chips of wood from being drawn into the motor, I make the bore of both casing parts of a diameter sufficiently larger than that of the stator core 10 so as to leave a free annular air space around this core, as shown in Fig. 3, in addition to the usual air passages between parts of that core and the armature of the motor. Then I fasten a fan 76 to the part of the shaft 9 behind the stator core and bearings, with its blades disposed for moving air forwardly through perforations P in both heads of the casing, this fan being housed by the rear casing part 15.

To support the motor, I provide a pivoting member fastened to a stationary portion of the lathe and preferably to a portion at the opposite side from the user of the lathe. As here shown this pivoting member comprises heavy metal strip 18 having its lower end fastened to a side flange 1A of the bed of the lathe, and a pivot pin 19 fastened to this bracket and extending parallel to the axis of the spindle 6. To cheapen the construction, I preferably form this bracket strip 18 so as to present an outwardly embossed arch portion 19A intermediate of the riser edges of the strip, and also to present alined outwardly open grooves 20 at opposite sides of this arch portion, as shown in Fig. 7. Then I insert in the said grooves and under the said arch portion a cylindrical pin 19 of such diameter as to be tightly gripped by the said arch portion and clamped against the said grooves.

To cooperate with this pin for the pivoting, I fasten to the forward motor casing part 11 a pivoting member here shown as a bracket plate 21 having two outwardly directed parallel ears 22, which ears have alined perforations slidably fitting the pivot pin 19. After this bracket has had its ears slipped over the said pin, as shown in Fig. 1, I also insert a cotter 23 through the pin to limit the sliding of the motor away from the lathe head, while allowing a sliding of the motor in the opposite direction to be limited by engagement of the forward casing part 11 with the head 4 of the lathe.

When thus supported, the motor (along with the bracket 21) can readily be moved rotationally about the pivoting pin 20 and also longitudinally of that pin to the just recited limiting extent. With the pivoting pin thus disposed, the user can freely grasp the motor casing so as to lift the motor to raise the friction ring 7 momentarily off the driven wheel while sliding the motor to bring that wheel opposite any other groove ($P^1$, $P^2$ or $P^3$) on that wheel, after which the weight of the motor will seat the drive wheel in its changed driving position.

During such a shifting for effecting speed changes, the drive wheel and the casing of the motor will shift, for example, from the full line position of Fig. 1 (for the slowest speed) to the dotted line position of the same figure for the highest speed. Likewise, the contour of the motor casing will shift consecutively from the full line position L shown in the front view of Fig. 5 (at low speed) to the intermediate position M, and thereafter to the high-speed position S. And, since the center of gravity of the motor is almost over the axis of the grooved driven wheel of the lathe, the weight of the motor always holds the drive wheel firmly engaged with the wheel groove on which that wheel is seated, while the slidability of the motor bracket 21 on the pivot pin 19 allows the motor to shift longitudinally along that pin in case the said friction wheel did not exactly aline with the wheel groove into which it was lowered.

However, since the swiveling bracket or pivoting member 21 is fastened only to the forward part of the motor casing, and since the pivot pin 19 projects freely rearward from the bracket 18 which is still farther forward, the weight of the motor might tend to bend the said pin. Furthermore, this weight might cause undue friction between the drive wheel and the grooved driven wheel of the lathe, and also at the bearings for the spindle 6.

To overcome these objections, I provide an auxiliary supporting member for cooperating with the said pivot pin in supporting the motor when the latter is in an operative position, and arrange this member so that it can be easily and instantly adjusted. In Figs. 1 and 2 this auxiliary supporting member is a lever 25 punched from flat metal and pivoted intermediate its ends to a bracket 26 fastened to the under side of the lathe bed as shown in Fig. 5, the fastening being preferably by a rivet 27 extending also through spring washers 28 (Fig. 1) which will latch this lever in any adjusted position.

The lower lever arm 25A of this auxiliary supporting member is preferably formed as a handle, as shown in Fig. 2, while the upper and shorter arm has a cam-shaped edge 25C disposed for underhanging the casing of the motor. Thus arranged, this lever can instantly be moved by the user so as to dispose its cam edge in engagement with the casing of the motor, as shown in dotted lines in Fig. 5 for each of the three elevations of the motor corresponding to the three speeds of the drive. When thus disposed, this auxiliary lever steadies the assembly and also may be adjusted to vary the friction between the rubber rim 7 of the drive wheel and the driven wheel.

Moreover, by pressing downward slightly on the longer and lower arm 25A of the lever, the user can instantly raise the drive wheel sufficiently off one of the grooves of the driven wheel of the lathe to interrupt the driving without operating a switch or halting the motor, and he also can instantly restore the driving connection by a slight shift of the lever in the opposite direction.

Furthermore, by making the cam-shaped upper arm of this adjustable lever of a suitable width, I also enable this lever to act as a stop to limit the swinging of the motor when the motor has been swung about the pivot pin to carry the axis of the motor (along the dotted arc 38 in Fig. 5) beyond a vertical plane axial of the said pin. Thus, the dotted casing contour D in Fig. 5 shows how the motor is then halted by a straight edge of the upper arm of the said adjustable lever (or auxiliary motor support) in a position in which the drive is inoperative.

Since the outward bearing 30 (Fig. 1) for the motor shaft 9 is disposed between the stator core 10 and the detachable casing part 15, this bearing is not readily accessible for oiling it, although the usual forward bearing (not illustrated) can be reached by the spout of an oil can inserted through one of the apertures in the stationary casing part 11.

To afford lubrication for the outward bearing 30 I provide the detachable casing part 15 with an aperture 31 approximately above this bearing, and an oil-guiding metal strip which feeds oil from this aperture to the part of the motor shaft adjacent to the said bearing. This oil-guiding strip comprises an upper part 32 which extends over a downwardly bowed arch 33 formed from the casing part 15 forwardly of the oil aperture 31 (this strip part 32 being fastened to the said casing part by one of the same screws 16 which fasten the two casing parts to each other) and a depending strip part 34 reaching downward almost to the motor shaft; and the oil feeding strip has a groove 35 extending under the oil port 31 and around the bend connecting the said two strip parts.

With my fan and motor assembly thus arranged, the fan continuously blows air through the motor and past the friction wheel ring 7 over the chuck 45 of the lathe and toward the wood gripped by that chuck. Consequently, the fan not only cools the motor but also blows all wood chips away from both the driving connections and the motor.

Since a cheaply formed bracket 26 together with an equally simple lever 25 suffices for the auxiliary supporting of the motor and fan assembly, I avoid the necessity of extending the lathe bed structure outward beyond the head 4 of the lathe, thereby decidedly reducing the cost in addition to affording a simple and easy control both for varying the speed of the lathe and for instantly starting and stopping the operation of the lathe. Moreover, this instantaneous control of the driving connection between the motor and the lathe saves the user a good deal of time, as compared with the usual necessity of reaching to a switch or disconnecting a cord plug.

However, while I have heretofore described my invention in an embodiment including numerous desirable details of construction and arrangement, I do not wish to be limited in these respects, since many changes might be made without departing either from the spirit of my invention or from the appended claims. Nor do I wish to be limited to the conjoint use of all novel features of my invention.

Moreover, my here disclosed variable speed drive control would also operate to equal advantage if the horizontal driven shaft was connected to some other object than a wood chuck, hence I do not wish to be limited to the use of my invention in connection with a lathe.

I claim as my invention:

1. An electrically actuated tool comprising a stationary member, a horizontal spindle journaled in the said member, a driven wheel fast on the spindle, an electric motor pivotally supported by the said member upon a pivot axis parallel to the axis of the spindle and the shaft of the motor; a driving wheel fast on the shaft of the motor and adapted to engage the periphery of the driven wheel when the motor is swung about the said pivot axis to dispose the motor shaft at higher elevation than the said spindle; and an auxiliary motor-supporting member supported from the stationary member and upwardly engaging a part of the motor when the motor is in its said disposition to cooperate with the pivotal support for the motor in sustaining the weight of the motor.

2. An electrically actuated tool as per claim 1, including a bracket fast with respect to the journaling member and upon which the auxiliary motor-supporting member is pivoted, the latter member being farther outward from the stationary member than the pivoting connection of the motor to the stationary member.

3. An electrically actuated tool as per claim 1, in which the said auxiliary member is pivoted on the stationary member; and friction means associated with the said pivoting of the stationary member for releasably holding the auxiliary member in any adjusted position.

4. An electrically actuated tool as per claim 1, in which the said auxiliary member is also disposed for engaging the motor to limit the swinging of the motor about its said pivoting connection in the direction in which the axis of the motor shaft is disposed at lower elevation than the said pivot axis.

5. An electrically actuated tool as per claim 1, in which the said pivot axis is intermediate in elevation between the axes of the spindle and the motor shaft when the motor is in its said disposition.

6. An electrically actuated tool as per claim 1, in which the said auxiliary member is a lever of the first class pivoted to the stationary member on an axis below that of the said spindle; the lever having a cam-shaped upwardly facing edge adapted to engage a part of the motor, whereby the elevation of the motor can be raised by moving the lever in one direction, so as to vary the friction between the said wheels and to raise the driving wheel on the motor-shaft out of engagement with the said driven wheel.

7. An electrically actuated tool as per claim 1, in which the motor includes a stator core and a casing housing the said core, the casing comprising two cup-shaped parts fastened to each other at their mouth ends, the casing part nearest to the spindle being fastened to the stator core and disposed for being upwardly engaged by the auxiliary motor-supporting member.

8. An electrically actuated tool comprising a head member, a horizontal spindle journaled in the head member, a multi-grooved driven wheel fast on the spindle forwardly of the head member; a bracket fast upon and extending at one side of the head member; a pivot pin fast upon the bracket and extending parallel to the spindle; an electric motor pivoted on the said pin and including a motor shaft; a driving wheel fast on the motor shaft and adapted to engage a groove of the spindle wheel when the motor is swung about the pivot pin to dispose the axis of the motor at higher elevation than the axis of the spindle wheel; the motor being adapted to be slid longitudinally along the pin when the said driving wheel is not engaging a groove of the driven wheel, so as to permit the driving wheel to be brought into engagement with any groove of the driven wheel.

9. An electrically actuated tool as per claim 8, including an auxiliary supporting member supported by the head member and adapted to be moved into engagement with a downwardly facing part of the motor to cooperate with said pivot pin in supporting the motor.

10. The combination with an appliance having a substantially horizontal shaft journaled in a stationary part of the said appliance and a wheel operatively connected to the said shaft, of an electric motor having its shaft extending parallel to the said appliance shaft and presenting at least a portion of its casing outward of the head in a direction longitudinal of the said shaft; a drive wheel on the motor shaft normally engaging the aforesaid wheel; means pivotally connecting the motor to a stationary part of the appliance for swinging movement about an axis parallel to and spaced from the axes of both of the said shafts; and adjustable means supported by a stationary part of the appliance and spaced outwardly from the said head and underhanging the said casing for cooperating with the said pivotal connecting means to support the motor.

11. The combination with an appliance having a substantially horizontal shaft journaled in its head and a wheel operatively connected to the said shaft, of an electric motor having its shaft extending parallel to the said appliance shaft and presenting at least a portion of its casing outward of the said head; a drive wheel on the motor shaft normally engaging the aforesaid wheel; main motor-supporting means interposed between a stationary part of the appliance and the portion of the casing adjacent to the said head for supporting the motor; and auxiliary motor-supporting means supported by a stationary part of the appliance and engaging a portion of the casing farther away from the said head than the main motor-supporting means.

12. In an electrically actuated tool, a stationary head, a horizontal spindle journaled in the head, a bracket fast with respect to the head and extending outwardly longitudinally of the head; a driven wheel fast on the spindle; an electric motor including a casing and a shaft; a drive wheel fast on the forward end of the motor shaft; means operatively interposed between the said head and the said motor for supporting the motor with the drive wheel seated upon the driven wheel and with the motor casing disposed outwardly of the said head and normally overhanging the said bracket; and an auxiliary motor-supporting member movably supported by the said bracket and in upward engagement with the casing of the motor.

13. An electrically actuated tool as per claim 12, in which the auxiliary motor-supporting member is pivoted to the bracket on an axis lower than that of the said spindle and is a lever including an upper arm presenting a cam edge for engagement with the motor casing.

14. An electrically actuated tool as per claim 12, in which the auxiliary motor-supporting member is pivoted to the bracket on an axis lower than that of the said spindle and is a lever including an upper arm presenting a cam edge for engagement with the motor casing, the said upper arm of the lever having its opposite edge disposed for engaging the motor casing when the motor is in an inoperative position.

15. An electrically actuated tool as per claim 12, in which the said interposed means comprise a generally upright bracket fastened to the said head and a pin fastened to the upper portion of the said bracket and extending parallel to the said spindle alongside the motor, and a second bracket fastened to the casing of the motor and having parallel ears provided with alined perforations through which the said pin extends.

16. An electrically actuated tool as per claim 12, in which the said interposed means comprise a generally upright strip-like bracket fastened to the said head, the upper portion of the bracket having a part thereof punched to form a semi-cylindrical arch and having the portions at opposite ends of the said arch part formed to afford alined grooves; and a pin extending under the said arch and seated in the said grooves and projecting alongside the motor parallel to the said spindle, and a pivoting member journaled and slidable on the said pin and fastened to the casing of the motor.

17. As means for feeding oil to a shaft projecting from the bearing of a motor which is housed by a casing provided with an oil port overhanging the said bearing, an oil-guiding strip comprising an upper and approximately horizontal portion extending below and adjacent to said port and a continuation portion extending downwards toward the said shaft, the said continuation portion having its lower end near but freely spaced from the said bearing.

18. Oil feeding means as per claim 17, in which the part of the oil-strip adjacent to the said port is of an upwardly concaved cross-section.

19. An assemblage of an electric motor and oil-guiding strip as per claim 17, in which the casing comprises two opposed cup-shaped parts opening toward each other, including common means for fastening the mouth end of one of the said casing parts both to the mouth end of the other casing part and to the said upper portion of the oil-guiding strip.

20. An electric motor and motor casing assembly, comprising a stator, an axially horizontal bearing fast with respect to the stator; a rotor including a shaft extending through the bearing; a multi-part casing housing the said stator, bearing and rotor; the casing including a casing part fast with respect to the stator and a detachable part provided with an oil port at higher elevation than the said bearing; an oil-guiding strip including an upper part having a portion thereof underhanging and adjacent to the said port, and also including a part depending from the aforesaid part and presenting its lower end above the portion of the shaft adjacent to and outward of the said bearing; and means conjointly fastening the detachable casing part to the stationary casing part and to the said upper part of the said oil-guiding strip.

21. An electric motor, motor casing, oil-guiding strip and fastening means as per claim 20, in which the first named casing part includes a portion spaced from the said fastening means and through which portion the free end of the upper part of the oil-guiding strip is adapted to be slid before the detachable casing part is attached to the first-named casing part, the said casing part portion serving to prevent the oil-guiding strip from rocking about the said fastening means.

BERNHART A. BENSON.